United States Patent [19]
Enders

[11] Patent Number: 5,683,100
[45] Date of Patent: Nov. 4, 1997

[54] AIRBAG CUSHION RETAINER WITH ANNULAR SEWING AREA

[75] Inventor: Mark L. Enders, North Ogden, Utah

[73] Assignee: Morton International, Inc., Chicago, Ill.

[21] Appl. No.: 679,620

[22] Filed: Jul. 12, 1996

[51] Int. Cl.$^6$ ................................................ B60R 21/16
[52] U.S. Cl. .................................................. 280/728.2
[58] Field of Search ........................... 280/728.2, 731, 280/741

[56] References Cited

U.S. PATENT DOCUMENTS

| | | | |
|---|---|---|---|
| 4,913,461 | 4/1990 | Cuevas | 280/731 |
| 5,064,218 | 11/1991 | Hartmeyer | 280/728.2 |
| 5,176,400 | 1/1993 | McGuire et al. | 280/728 |
| 5,193,846 | 3/1993 | Allard | 280/728 |
| 5,195,774 | 3/1993 | Morita | 280/731 |
| 5,295,706 | 3/1994 | Morita | 280/728.2 |
| 5,368,327 | 11/1994 | Shiraki et al. | 280/731 |
| 5,443,284 | 8/1995 | Strahl et al. | 280/728.2 |
| 5,445,406 | 8/1995 | Jones | 280/728.2 |

*Primary Examiner*—Paul N. Dickson
*Attorney, Agent, or Firm*—George W. Rauchfuss, Jr.; Gerald K. White

[57] ABSTRACT

A cushion retainer for mounting an airbag cushion, having an inner edge defining an open mouth, to an airbag module baseplate defining an inflator-receiving aperture, so that the open mouth of the airbag inflator is aligned with the inflator-receiving aperture of the module baseplate. The airbag cushion retainer includes a rigid annular plate sized to fit around the inflator receiving aperture, and an annular sewing area extending radially outwardly from the annular plate. The sewing area is securable to the airbag cushion with stitches. According to one embodiment, the annular sewing area has a thickness that decreases outwardly to an outer periphery that is thin enough to accept a sewing needle or other sewing tool. According to another embodiment, the annular sewing area defines a multiplicity of holes for receiving stitches. According to a further embodiment, an annular fabric ring is secured to a bottom surface of the annular plate and extends radially outwardly from the annular sewing area. Another cushion retainer according to the present invention includes an inwardly facing threaded mating surface for receiving a threaded sidewall of an airbag inflator to secure the airbag cushion retainer, an airbag cushion and the airbag inflator to a module baseplate. An airbag inflator having a threaded sidewall is also provided.

24 Claims, 7 Drawing Sheets

AIRBAG CUSHION RETAINER WITH ANNULAR SEWING AREA

FIELD OF THE INVENTION

The present invention relates to an airbag module and, more particularly, to an airbag cushion assembly. Even more particularly, the present invention relates to an airbag cushion retainer having an annular sewing area, that can be sewn to an airbag cushion, and a threaded insert molded collar ring for threadingly engaging an airbag inflator.

BACKGROUND OF THE INVENTION

An airbag cushion retainer is used for retaining an airbag cushion within an airbag module. An airbag module is employed in a vehicle, particularly an automobile, for protecting an occupant against injury by deploying an inflated airbag cushion to physically restrain the occupant's body when the automobile encounters a collision. A driver side airbag module normally includes an airbag cushion, an airbag inflator for inflating the airbag cushion upon receiving a signal from a remote collision sensor, and a module baseplate upon which the airbag cushion and inflator are mounted. The inflator generally has a cylindrical sidewall extending through an inflator-receiving aperture of the module baseplate and an inflator flange extending radially outwardly from the sidewall and abutting a bottom surface of the baseplate. The airbag cushion has an open mouth formed by an inner edge that fits around the inflator with the inner edge positioned against a top surface of the baseplate. An airbag cushion retainer positioned on the collar of the airbag cushion fits around the sidewall of the inflator, and fasteners such as bolts pass through the cushion retainer, the collar of the airbag cushion, the baseplate and the inflator flange and are fastened with nuts for example to secure the airbag module together.

It would be useful to provide a cushion retainer that can be easily secured to an airbag cushion so that the airbag cushion and cushion retainer can be stored and handled as a single airbag cushion assembly prior to assembly of the airbag module. It would also be useful to provide a cushion retainer that incorporates its own, integral fasteners in order to eliminate the separate fasteners to reduce parts and simplify the assembly process. It would additionally be useful to provide a cushion retainer having means for retaining the cushion retainer and airbag cushion to the module baseplate prior to assembly of the airbag inflator.

A general object, therefore, of the present invention is to provide a new and improved airbag module.

A more specific object of the present invention is to provide a new and improved airbag cushion assembly.

A still more specific object of the present invention is to provide a new and improved airbag cushion retainer.

Another object of the present invention is to provide an airbag cushion retainer that can be easily secured to an airbag cushion to form an airbag cushion assembly.

An additional object of the present invention is to provide an airbag cushion retainer having integral fasteners.

A further object of the present invention is to provide an airbag cushion retainer having means for retaining the airbag cushion assembly to a module baseplate of an airbag module prior to assembly of an airbag inflator to the airbag module.

SUMMARY OF THE INVENTION

In carrying out this invention, there is provided an airbag cushion retainer for mounting an airbag cushion, having an inner edge defining an open mouth, to a module baseplate defining an inflator-receiving aperture, so that the open mouth of the airbag inflator is aligned with the inflator-receiving aperture of the module baseplate. The airbag cushion retainer includes a rigid annular plate sized to fit around the inflator-receiving aperture, and an annular sewing area extending radially outwardly from the annular plate. The sewing area is securable to the airbag cushion with stitches so that the airbag cushion retainer can be easily secured to the airbag cushion to form an airbag cushion assembly.

According to one aspect of the present invention, the annular sewing area has a thickness that decreases outwardly to an outer periphery that is thin enough to allow a sewing needle to pass therethrough. According to another aspect of the present invention, the annular sewing area defines a multiplicity of holes for receiving stitches. According to a further aspect of the present invention, an annular fabric ring is secured to a bottom surface of the rigid annular plate and extends radially outwardly from the annular sewing area.

According to one aspect of the present invention, the rigid annular plate defines a plurality of spaced-apart fastener receiving openings. The fastener receiving openings are for receiving fasteners such as bolts for securing the airbag cushion retainer to a module baseplate. According to one aspect of the present invention, a plurality of spaced-apart fasteners have heads insert-molded or welded into the rigid annular plate and studs extending from the bottom surface of the rigid annular plate. The studs are sized and positioned to pass through corresponding fastener-receiving holes defined by a module baseplate to secure the airbag cushion retainer to the module baseplate. The present invention, therefore, provides an airbag cushion retainer having integral fasteners.

According to another aspect of the present invention, a plurality of spaced-apart projections extend downwardly from a bottom surface of the rigid annular plate. The projections are sized to extend through a corresponding plurality of projection receiving openings defined by the module baseplate, so that distal ends of the projections can be deformed to secure the airbag cushion retainer to the baseplate. The present invention, therefore, also provides an airbag cushion retainer having means for retaining the airbag cushion retainer and an attached airbag cushion to a module baseplate prior to assembly of an airbag inflator to the module baseplate.

Another airbag cushion retainer according to the present invention is also provided. The airbag cushion retainer includes a rigid annular plate sized to fit around the inflator receiving aperture over the airbag cushion. A plurality of spaced-apart anti-rotation projections extend downwardly from a bottom surface of the rigid annular plate and are sized to extend into a corresponding plurality of projection receiving openings defined by the module baseplate. An inwardly facing threaded mating surface is positioned on an inner side surface of the rigid annular plate for receiving a threaded sidewall of an airbag inflator.

According to one aspect of the present invention, the threaded mating surface is provided in the form of the inner side surface of the rigid annular plate, the inner side surface being threaded. According to another aspect of the present invention, an annular coupler having an outer face is secured to an inner side surface of the rigid annular plate. The threaded mating surface is provided in the form of a threaded inner face of the annular coupler.

An improved airbag inflator according to the present invention is also provided. The airbag inflator includes a cylindrical sidewall defining a plurality of gas exhaust ports, and an inflator flange extending radially outwardly from the sidewall below the gas exhaust ports. The improvement is in the form of a portion of the sidewall located above the inflator flange and below the gas exhaust ports being threaded. The inflator, therefore, can be threadingly received by a threaded mating surface of an airbag cushion retainer according to the present invention.

The invention together with further objects, features, advantages and aspects thereof, will be more clearly understood from the following description taken in connection with the accompanying drawings.

BRIEF DESCRIPTION OF THE DRAWINGS

The same reference numerals refer to the same elements throughout the various figures.

DETAILED DESCRIPTION OF THE INVENTION

Figure 1:
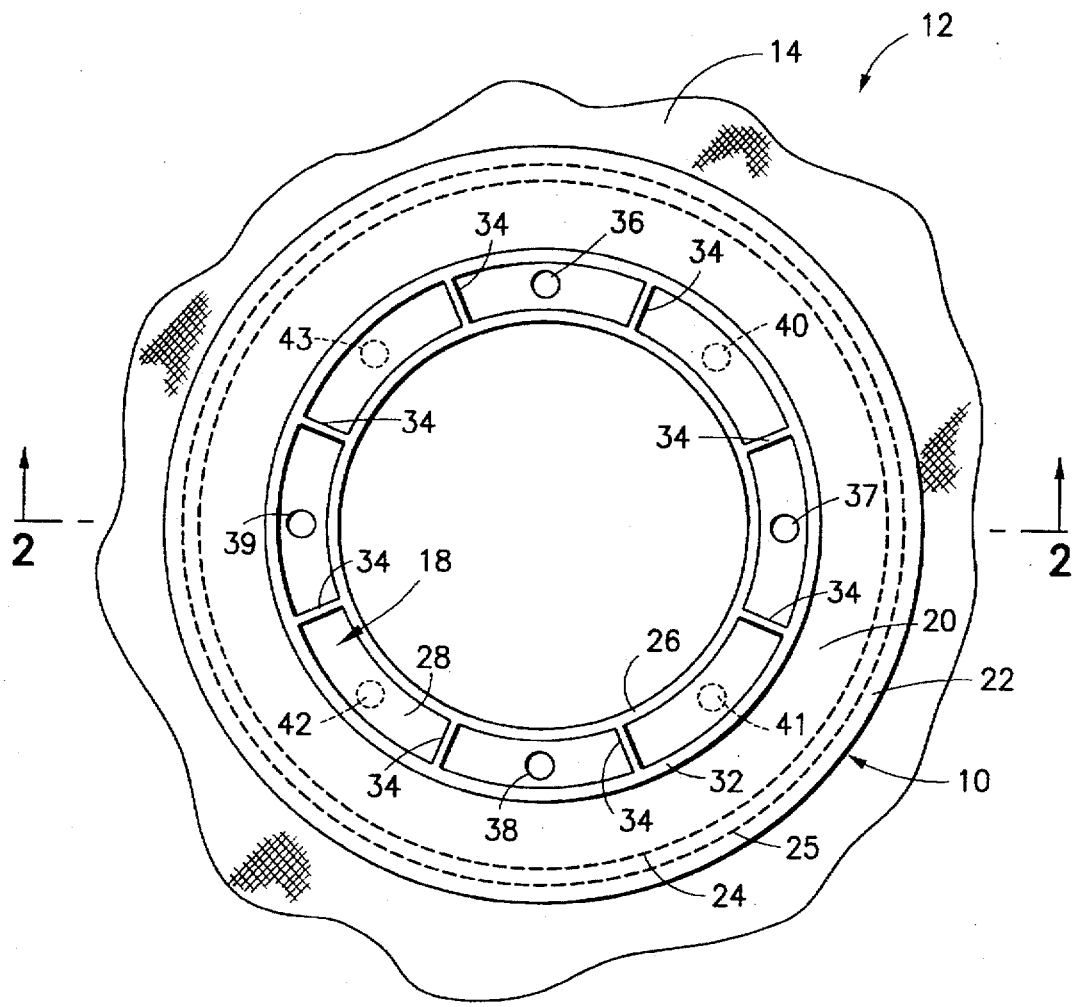
FIG. 1 is a partial top plan view of an airbag cushion assembly including an airbag cushion retainer according to the present invention.
Figure 2:
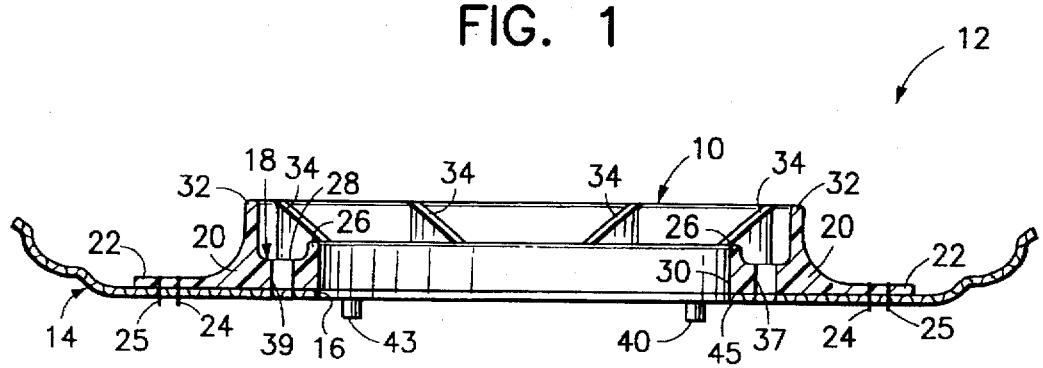
FIG. 2 is a cross-sectional view of the airbag cushion assembly of FIG. 1, taken along the line 2—2 of FIG. 1.

Referring first to FIGS. 1 and 2, the present invention provides an airbag cushion retainer 10 for use as part of an airbag cushion assembly 12 also including an airbag cushion 14. The airbag cushion 14 has an inner edge 16 defining an open mouth. In general, an airbag cushion includes at least two panels of fabric, the fabric panels usually made of nylon covered, at least partially, with neoprene for example, sewn together so that the airbag cushion will inflate upon receiving inflation gas from an inflator during a vehicle collision to provide a cushion between the vehicle occupant and interior portions of the vehicle. An airbag cushion is known in the art and, therefore, not described here in further detail except as relating to the airbag cushion retainer 10.

The airbag cushion retainer 10 is fabricated from a suitably rigid plastic, such as reinforced nylon for example, and includes a rigid annular plate 18 and an annular sewing area 20 unitary with and extending radially outwardly from the annular plate. The sewing area 20 has a thickness that decreases outwardly to an outer periphery 22 that is thin enough to be sewn to the airbag cushion 14 to secure the airbag cushion retainer 10 to the airbag cushion with stitches. Specifically, the outer periphery 22 can have a thickness of about between 0.010 and 0.030 inches (0.25 and 0.76 millimeters) for example. The outer periphery 22 therefore is thin enough to allow a sewing needle or other sewing tool to puncture the annular sewing area 20 to secure the airbag cushion 14 to the airbag cushion retainer 10 with stitches. As shown, the airbag cushion retainer 10 is positioned on top of the airbag cushion 14 in alignment with the open mouth 16 and the outer periphery 22 is secured to the airbag cushion with two rows of stitching 24,25 to form the airbag cushion assembly 12.

The outer periphery 22 of the annular sewing area 20, therefore, allows the airbag cushion retainer 10 to be easily secured to the airbag cushion 14 to form the airbag cushion assembly 12 which can be handled as a single unit prior to assembly to an airbag module. In addition, the rows of stitching 24,25 help to ensure that the airbag cushion 14 will remain secured and correctly positioned during inflation.

The airbag cushion retainer 10 also includes an inner wall 26 that is unitary with and extends upwardly from a top surface 28 of the annular plate 18 adjacent an inner side surface 30 of the annular plate. An outer wall 32 is unitary with and extends upwardly from the top surface 28 of the annular plate 18 adjacent the annular sewing area 20. In addition, a plurality of spaced-apart strengthening ribs 34 are unitary with and extend upwardly from the top surface 28 of the annular plate 18 and extend between the inner wall 26 and the outer wall 32.

The annular plate 18 defines four equally spaced-apart fastener receiving openings 36,37,37,39, and four equally spaced-apart projections in the form of cylindrical studs 40,41,42,43 extending downwardly from a bottom surface 45 of the annular plate. The studs 40,41,42,43 are sized to extend through a corresponding plurality of projection receiving openings defined by a module baseplate, so that the distal ends of the studs can be deformed, by ultrasonic welding for example, to secure the airbag cushion assembly 12 to the module baseplate prior to installation of an airbag inflator. Such projections are known in the art and a cushion retainer having such projections is disclosed in U.S. Pat. No. 5,443,284, assigned to the assignee of the present invention and incorporated herein by reference.

Figure 3:
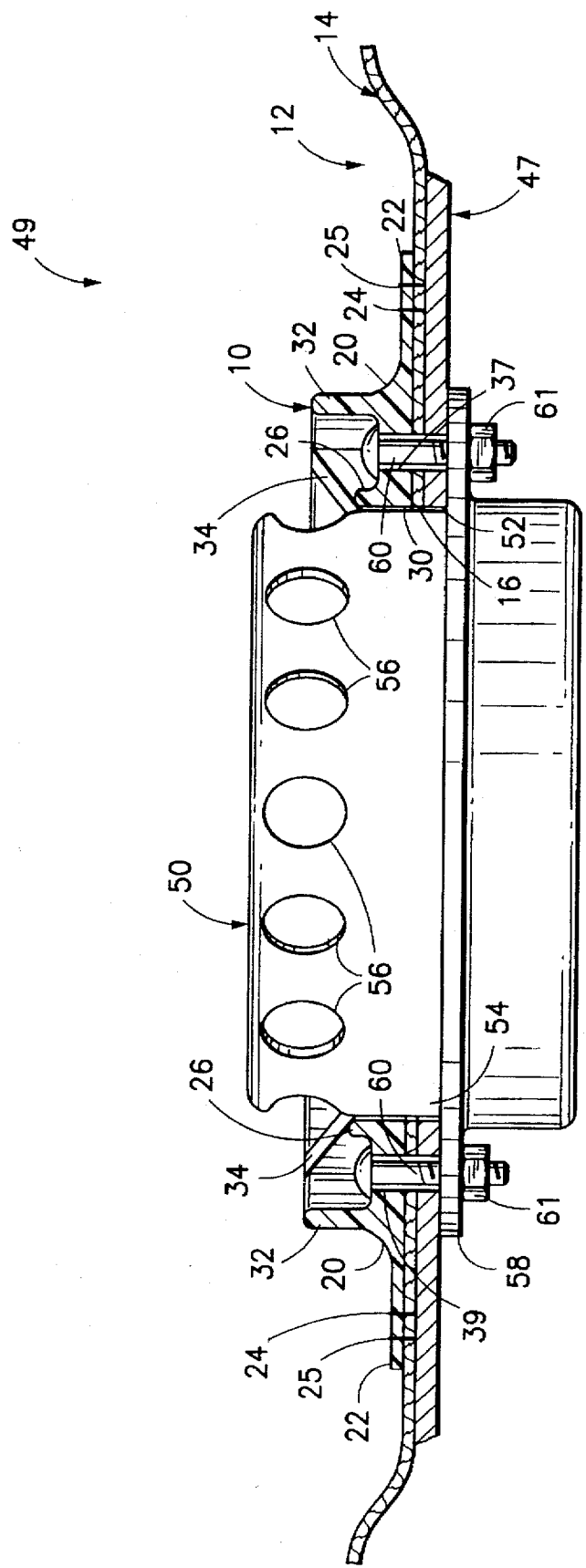
FIG. 3 is a side plan view, partially in section, of an airbag module incorporating the airbag cushion assembly of FIGS. 1 and 2.

Referring to FIG. 3, the airbag cushion assembly 12 is shown mounted to a module baseplate 47 as part of an airbag module 49 including an airbag inflator 5e for inflating the airbag cushion 14. The module baseplate 47 defines an inflator-receiving aperture 52 around a cylindrical sidewall 54 of the airbag inflator 50, which defines a plurality of gas exhaust ports 56. The airbag inflator 50 has an inflator flange 58 extending radially outwardly from the sidewall 54 and abutting the module baseplate 47. Four fasteners in the form of bolts 60 (only two are shown) pass through the fastener receiving openings 36,37,37,39 of the airbag cushion retainer 10 and through the module baseplate 47 and the inflator flange 58 and are fastened with four nuts 61 (only two are shown) to secure the airbag cushion assembly 12 and the airbag inflator 50 to the module baseplate.

The airbag inflator 50 contains means for producing inflation gas such as a solid pyrotechnic gas generant or a stored compressed inert gas with a pyrotechnic initiator for example. The inflation gas exits the inflator 50 through the gas exhaust ports 56 at a high pressure and temperature. As shown, the outer wall 32 of the airbag cushion retainer 10 can extend upwardly above the module baseplate 47 to about equal with the gas exhaust ports 56 to act as a heat shield for the airbag cushion 14.

Figure 4:
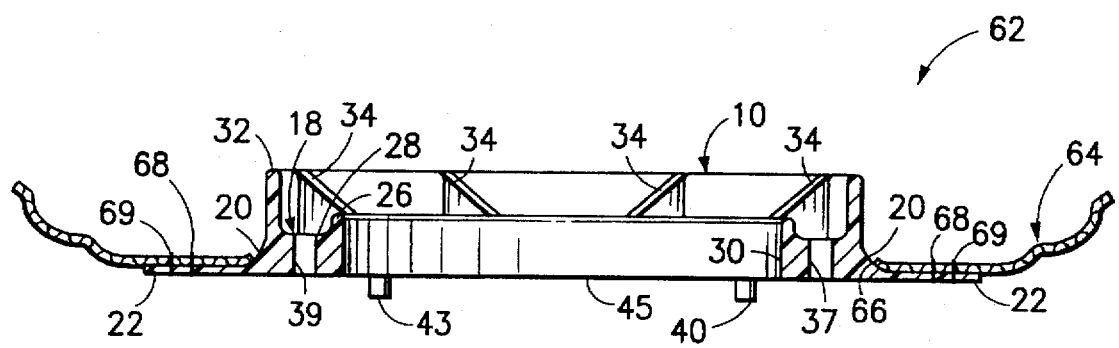
FIG. 4 is a cross-sectional view of another airbag cushion assembly according to the present invention.
Figure 5:
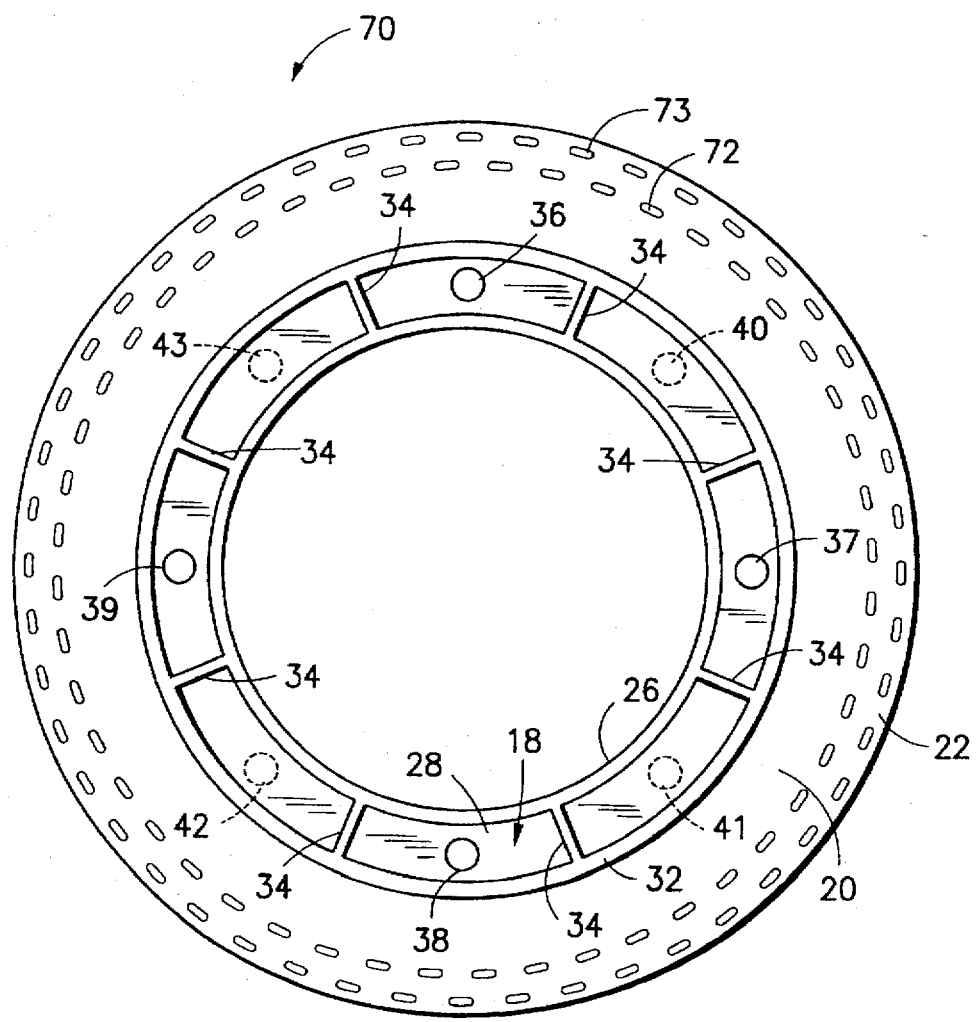
FIG. 5 is a top plan view of an additional airbag cushion retainer according to the present invention.

FIG. 4 shows another airbag cushion assembly 62 according to the present invention that is similar to the airbag cushion assembly 12 of FIGS. 1 and 2 and elements that are the same have the same reference numeral. The airbag cushion assembly 62 includes an airbag cushion 64 having an inner edge 66 defining an open mouth. Instead of being positioned below the airbag cushion retainer 10, the airbag cushion 64 is positioned over the airbag cushion retainer with the inner edge 66 of the airbag cushion surrounding the outer wall 32 over the annular sewing area 20. The airbag cushion 64 is secured to the airbag cushion retainer 10 with two rows of stitching 68,69 which pass through the airbag cushion and the outer periphery 22 of the annular sewing area 20 of the airbag cushion retainer.

FIGS. 5 through 8 show other airbag cushion retainers according to the present invention that are similar to the airbag cushion retainer 10 of FIGS. 1 through 3 and elements that are the same have the same reference numeral. The airbag cushion retainer 70 of FIG. 5 includes two rows of a multiplicity of spaced-apart stitch holes 72,73 defined by the outer periphery 22 of the annular sewing area 20. The rows of stitch holes 72,73 are for receiving stitches for sewing the airbag cushion retainer 70 to the airbag cushion 14. The rows of stitch holes 72,73 can be included if a sewing needle or other sewing tool cannot puncture the outer periphery 22 of the annular sewing area 20 of the airbag cushion retainer 70 as will happen if the airbag cushion retainer is made of metal or the airbag cushion retainer is made of plastic yet has an outer periphery that is not thin enough to be punctured.

Figure 6:
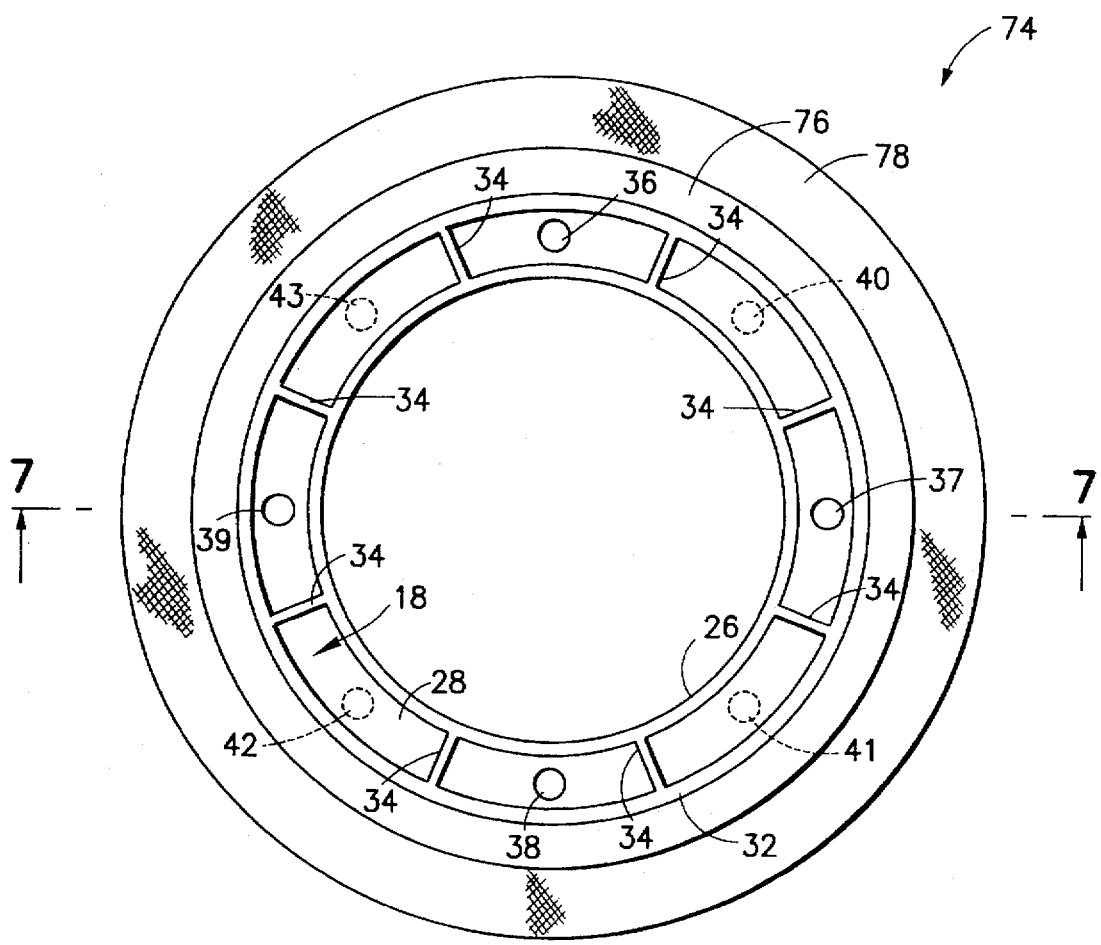
FIG. 6 is a top plan view of a further airbag cushion retainer according to the present invention.
Figure 7:
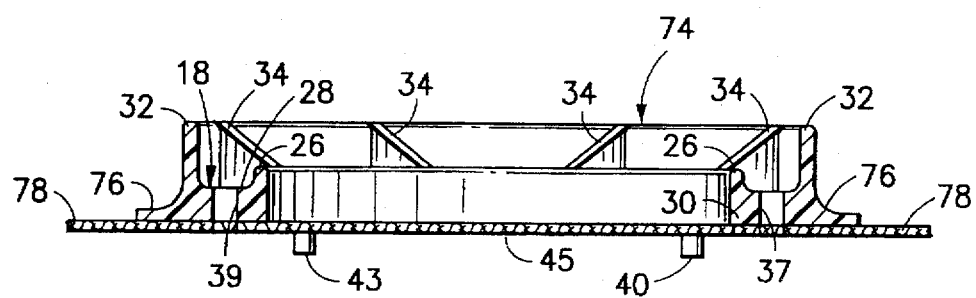
FIG. 7 is a cross-sectional view of the airbag cushion retainer of FIG. 6 taken along the line 7—7 of FIG. 6.

The airbag cushion retainer 74 of FIGS. 6 and 7 includes an annular sewing area 76 unitary with and extending radially outwardly from the annular plate 18, and a fabric ring 78, made of nylon for example, that extends radially outwardly from the annular sewing area 76 and is secured to the bottom surface 45 of the airbag cushion retainer. Preferably, the fabric ring 78 is insert molded with the airbag cushion retainer 74. The fabric ring 78 can be sewn to an airbag cushion 14 to secure the airbag cushion to the airbag cushion retainer 74 to form an airbag cushion assembly.

Figure 8:
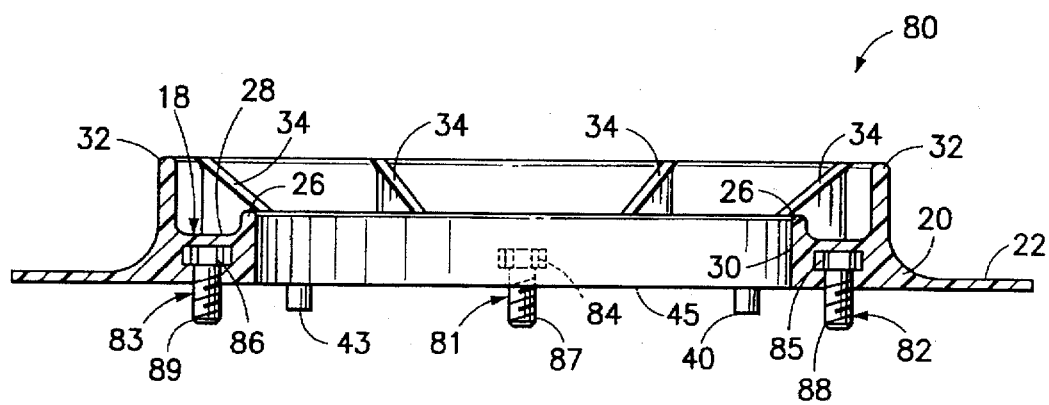
FIG. 8 is a cross-sectional view of still another airbag cushion retainer according to the present invention.

The airbag cushion retainer 80 of FIG. 8 includes four integral, metal fasteners 81,82,83 (only three are shown, the fourth is similar to and positioned opposite fastener 81) in place of the fastener receiving holes 36,37,38,39 of the airbag cushion retainer 10 of FIGS. 1 through 3 for securing the airbag cushion assembly and the airbag inflator to the module baseplate. The fasteners 81,82,83 each have heads 84,85,86 insert-molded or welded into the annular plate 18 and threaded studs 87,88,89 extending from the bottom surface 45 of the airbag cushion retainer 80. Each head 84,85,86 is multilobular in shape, as is known in the art, to provide a greater bonding area 20 between the heads and the plastic of the annular plate 18.

Figure 9:
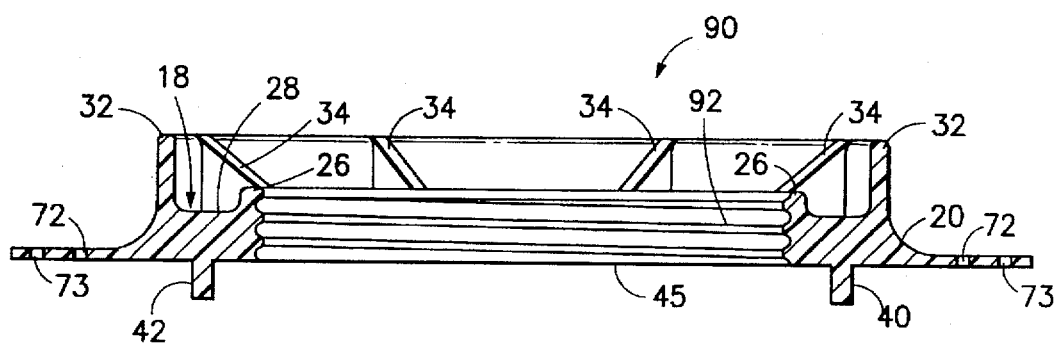
FIG. 9 is a cross-sectional view of yet an additional airbag cushion retainer according to the present invention.

Referring to FIG. 9, an additional airbag cushion retainer 90 according to the present invention is shown. The airbag cushion retainer 90 is similar to the airbag cushion retainer 70 of FIG. 5 and elements that are the same have the same reference numeral. As shown, the airbag cushion retainer 90 is made from a suitably rigid metal, such as steel or aluminum for example, but could also be made from a suitably rigid plastic. In place of the fastener receiving holes 36,37,38,39 of the airbag cushion retainer 70 of FIG. 5, the airbag cushion retainer 90 includes an inwardly facing, threaded mating surface in the form of a threaded, inner side surface 92 of the annular plate 18.

Figure 10:
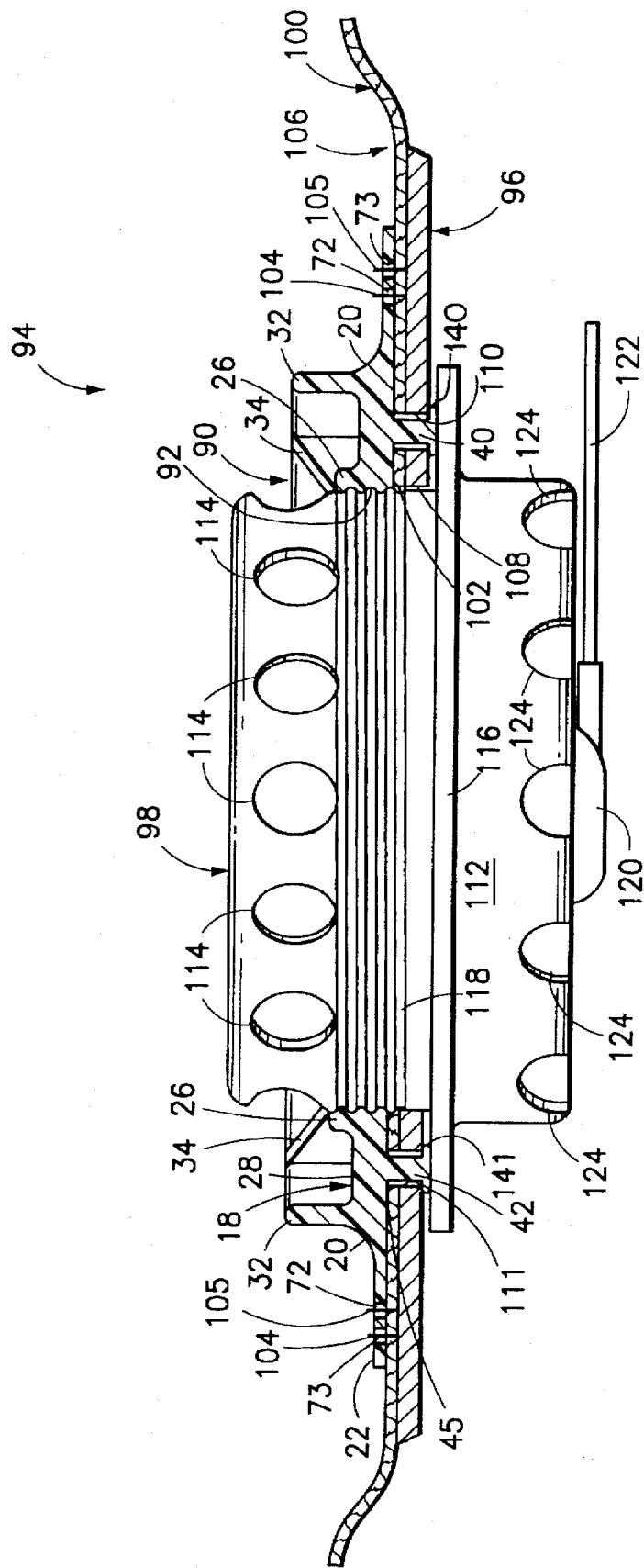
FIG. 10 is a side plan view, partially in section, of an airbag module incorporating the airbag cushion retainer of FIG. 9.

Referring to FIG. 10, an airbag module 94 incorporating the airbag cushion retainer 9e of FIG. 9 is shown and further includes a module baseplate 96 and an airbag inflator 98. The airbag cushion retainer 90 is positioned over an airbag cushion 100 having an inner edge 102 forming an open mouth, in alignment with the open mouth. The outer periphery 22 of the annular sewing area 20 of the airbag cushion retainer 90 is sewn to the airbag cushion 100 with two rows of stitching 104,105, which pass through the two rows of stitch holes 72,73 defined by the outer periphery, securing the airbag cushion to the cushion ring to form an airbag cushion assembly 106. The airbag cushion assembly 106 is positioned on the module baseplate 96 in alignment with an inflator-receiving aperture 108 defined by the module baseplate. The four studs 40,41,42,43 (only studs 40 and 41 are shown) extending downwardly from the bottom surface 45 of the airbag cushion retainer 90 extend through four corresponding projection receiving openings 110,111 (only two are shown) defined by the module baseplate 96. Distal ends 140,141 (only two are shown) of the studs 40,41,42,43 are deformed, by crimping or preening for example, to secure the airbag cushion assembly 106 to the module baseplate 96 prior to installation of the airbag inflator 98. The studs 40,41,42,43 also act as anti-rotation knobs preventing the airbag cushion retainer 90 from rotating with respect to the module baseplate 96.

The airbag inflator 98 includes a cylindrical sidewall 112 defining a plurality of gas exhaust ports 114 and an inflator flange 116 extends radially outwardly from the sidewall below the gas exhaust ports. The inflator flange 116 abuts the module baseplate 96 with a portion 118 of the inflator sidewall 112 above the inflator flange extending through the inflator-receiving aperture 108. As shown, the portion 118 of the sidewall 112 above the inflator flange 116 is threaded and is threadingly received, below the gas exhaust ports, by the threaded inner side surface 92 of the airbag cushion retainer 90, securing the airbag cushion assembly 106 and the airbag inflator 98 to the module baseplate 96.

A squib or connector 120 extends from below the airbag inflator 98, and a lead wire 122 extends from the squib for connection to a remote collision or deceleration sensor. It is often required that the squib 120 be oriented, or clocked in a particular direction so that the wire 122 can be positioned correctly within the airbag module 94. The threads of the threaded portion 118 of the inflator sidewall 112 and the threads of threaded inner side surface 92 of the airbag cushion retainer 90 can be engineered so that when the airbag inflator 98 is mounted to the airbag module 94, a specified number of turns of the airbag inflator would accomplish the required clamping force and correctly orient the squib 120. The airbag inflator 98 can also include a plurality of spaced-apart depressions 124 formed in the sidewall 112 for turning the airbag inflator.

Figure 11:
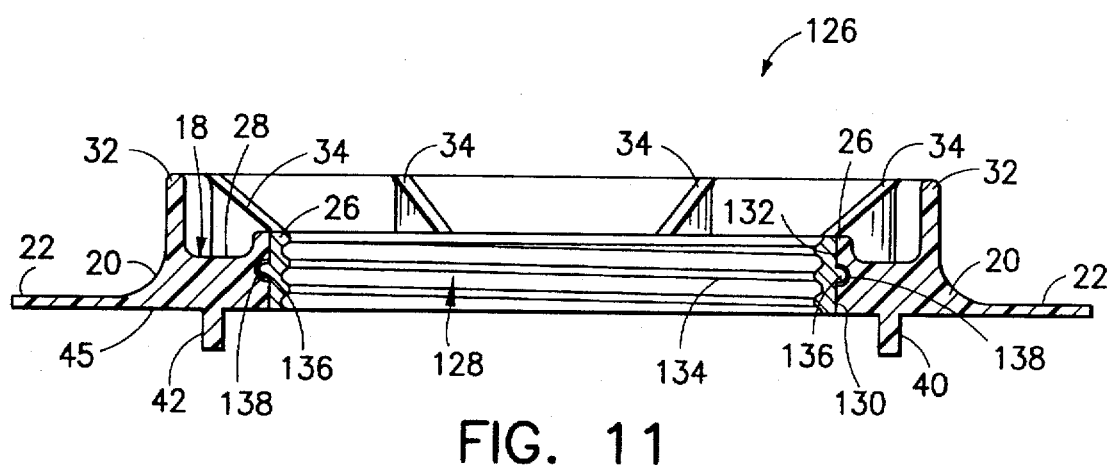
FIG. 11 is a cross-sectional view of a further airbag cushion retainer according to the present invention.
Figure 12:
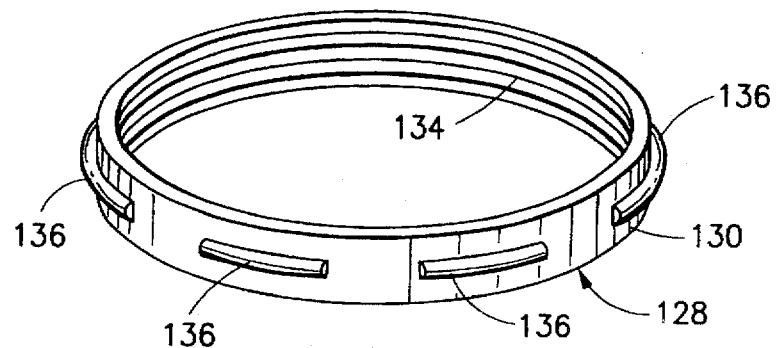
FIG. 12 is a side perspective view of a threaded insert ring of the airbag cushion retainer of FIG. 11.

Referring to FIG. 11, an additional airbag cushion retainer 126 according to the present invention is shown. The airbag cushion retainer 126 of FIG. 11 is similar to the airbag cushion retainer 10 of FIGS. 1 through 3 and elements that are the same have the same reference numeral. As shown, the airbag cushion retainer 126 is made from a suitably rigid plastic, but could also be made from a suitable metal, such as steel or aluminum for example. In place of the fastener receiving holes 36,37,38,39 of the airbag cushion retainer 10 of FIGS. 1 through 3, the airbag cushion retainer 126 includes an annular coupler 128 having an outer face 130 secured to an inner side surface 132 of the annular plate 18.

The airbag cushion retainer 126 includes an inwardly facing, threaded mating surface in the form of a threaded inner face 134 of the annular coupler 128 for threadingly receiving a threaded sidewall of an inflator similar to the airbag cushion retainer 90 of FIGS. 9 and 10. As also shown in FIG. 11, a plurality of protrusions in the form of spaced-apart, elongated ribs 136 protrude radially outwardly from the outer face 130 of the annular coupler 128 and are received in recesses 138 defined by the inner side surface 132 of the annular plate 18 to provide a strong axial and torque joint between the annular coupler and the airbag cushion retainer. The annular coupler 128 is preferably insert molded with the airbag cushion retainer 126.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

I claim:

1. An airbag cushion retainer for mounting an airbag cushion, having an inner edge defining an open mouth, to a module baseplate defining an inflator-receiving aperture, so that the open mouth of the airbag inflator is aligned with the inflator-receiving aperture of the module baseplate, the airbag cushion retainer comprising:

a rigid annular plate sized to fit around the inflator receiving aperture; and an annular sewing area unitary with and extending radially outwardly from the annular plate, the sewing area securable to the airbag cushion with stitches, wherein the annular sewing area has a thickness that decreases outwardly to an outer periphery that is thin enough to allow a sewing needle to pass therethrough.

2. The airbag cushion retainer of claim 1 wherein the annular sewing area defines a multiplicity of holes for receiving stitches.

3. The airbag cushion retainer of claim 1 further comprising an annular fabric ring secured to a bottom surface of the rigid annular plate and extending radially outwardly from the annular sewing area.

4. The airbag cushion retainer of claim 1 wherein the rigid annular plate defines a plurality of spaced-apart fastener receiving openings.

5. The airbag cushion retainer of claim 1 further comprising a plurality of spaced-apart fasteners having heads insert-molded or welded into the rigid annular plate and studs extending from the bottom surface of the rigid annular plate, the studs sized and positioned to pass through corresponding fastener-receiving holes defined by the module baseplate around the inflator receiving aperture to secure the airbag cushion to the airbag module assembly.

6. The airbag cushion retainer of claim 1 further comprising:

a plurality of spaced-apart anti-rotation projections extending downwardly from a bottom surface of the rigid annular plate and sized to extend into a corresponding plurality of projection receiving openings defined by the module baseplate; and an inwardly facing threaded mating surface positioned on an inner side surface of the rigid annular plate for receiving a threaded sidewall of an airbag inflator.

7. The airbag cushion retainer of claim 6 wherein the threaded mating surface comprises the inner side surface of the rigid annular plate, the inner side surface being threaded.

8. The airbag cushion retainer of claim 6 further comprising an annular coupler having an outer face secured to the inner side surface of the rigid annular plate, and wherein the threaded mating surface comprises a threaded inner face of the annular coupler.

9. The airbag cushion retainer of claim 8 wherein a plurality of spaced-apart protrusions extend radially outwardly from the outer face of the annular coupler and are received in a corresponding plurality of spaced-apart recesses defined by the inner side surface of the rigid annular plate.

10. The airbag cushion retainer of claim 6 wherein the plurality of spaced-apart anti-rotation projections extending downwardly from the bottom surface of the rigid annular plate are sized to extend through the corresponding plurality of projection receiving openings defined by the module baseplate, so that distal ends of the projections can be deformed to secure the airbag cushion retainer to the baseplate.

11. The airbag cushion retainer of claim 1 further comprising a plurality of spaced-apart projections extending downwardly from a bottom surface of the rigid annular plate and sized to extend through a corresponding plurality of projection receiving openings defined by the module baseplate, so that distal ends of the projections can be deformed to secure the airbag cushion retainer to the baseplate.

12. An airbag cushion assembly including an airbag cushion retainer according to claim 1, the assembly further comprising an airbag cushion having an inner edge defining an open mouth, the open mouth aligned with the airbag cushion retainer and the airbag cushion secured to the sewing area of the airbag cushion retainer with stitches.

13. An airbag cushion retainer for mounting an airbag cushion, having an inner edge defining an open mouth, to a module baseplate defining an inflator-receiving aperture so that the open mouth of the airbag inflator is aligned with the inflator receiving aperture of the module baseplate, the airbag cushion retainer comprising:

a rigid annular plate sized to fit around the inflator receiving aperture over the airbag cushion;

a plurality of spaced-apart anti-rotation projections extending downwardly from a bottom surface of the rigid annular plate sized to extend into a corresponding plurality of projection receiving openings defined by the module baseplate; and an inwardly facing threaded mating surface positioned on an inner side surface of the rigid annular plate for receiving a threaded sidewall of an airbag inflator.

14. The airbag cushion retainer of claim 13 wherein the threaded mating surface comprises the inner side surface of the rigid annular plate, the inner side surface being threaded.

15. The airbag cushion retainer of claim 13 further comprising an annular coupler having an outer face secured to an inner side surface of the rigid annular plate, and wherein the threaded mating surface comprises a threaded inner face of the annular coupler.

16. The airbag cushion retainer of claim 15 wherein a plurality of spaced-apart protrusions extend radially outwardly from the outer face of the annular coupler and are received in a corresponding plurality of spaced-apart recesses defined by the inner side surface of the rigid annular plate.

17. The airbag cushion retainer of claim 13 wherein the plurality of spaced-apart anti-rotation projections extending downwardly from the bottom surface of the rigid annular plate are sized to extend through the corresponding plurality of projection receiving openings defined by the module baseplate, so that distal ends of the projections can be deformed to secure the airbag cushion retainer to the baseplate.

18. The airbag cushion retainer of claim 13 further comprising an annular sewing area extending radially outwardly from an outer side surface of the rigid annular plate, the sewing area securable to the airbag cushion with stitches.

19. The airbag cushion retainer of claim 18 wherein the annular sewing area has a thickness that decreases outwardly to an outer periphery that is thin enough to allow a sewing needle to pass therethrough.

20. The airbag cushion retainer of claim 18 wherein the annular sewing area defines a multiplicity of holes for receiving stitches.

21. The airbag cushion retainer of claim 18 further comprising an annular fabric ring secured to a bottom surface of the rigid annular plate and extending radially outwardly from the annular sewing area.

22. An airbag cushion assembly including an airbag cushion retainer according to claim 18, the assembly further comprising an airbag cushion having an inner edge defining a mouth, the open mouth aligned with the airbag cushion retainer and the airbag cushion secured to the annular sewing area of the airbag cushion retainer with stitches.

23. An airbag module including an airbag cushion assembly according to claim 22 and further comprising:

a module baseplate defining an inflator-receiving aperture, the airbag cushion assembly positioned above the module baseplate in alignment with the inflator-receiving aperture;

an airbag inflator having a cylindrical sidewall defining a plurality of gas exhaust ports and an inflator flange extending radially outwardly from the sidewall below the gas exhaust ports, the cylindrical sidewall positioned within the inflator-receiving aperture of the module baseplate with the gas exhaust ports positioned above the module baseplate and the inflator flange abutting the module baseplate, a portion of the sidewall located above the inflator flange being threaded and threadingly received by the inwardly facing threaded mating surface of the airbag cushion retainer securing the airbag cushion assembly and the airbag inflator to the module baseplate.

24. In an airbag inflator for use as part of an airbag module, the airbag inflator comprising a cylindrical sidewall defining a plurality of gas exhaust ports, and an inflator flange extending radially outwardly from the sidewall below the gas exhaust ports, the improvement comprising:

a portion of the sidewall located above the inflator flange and below the gas exhaust ports being threaded.

* * * * *